(12) United States Patent
Jacob et al.

(10) Patent No.: US 8,831,147 B1
(45) Date of Patent: Sep. 9, 2014

(54) PARAMETER ESTIMATION IN VAMOUS RECEIVERS

(71) Applicant: Telefonaktiebolaget L M Ericsson (publ), Stockholm (SE)

(72) Inventors: Naveen Jacob, Kerala (IN); Amit Singhal, Bangalore (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 10 days.

(21) Appl. No.: 13/792,509

(22) Filed: Mar. 11, 2013

(51) Int. Cl.
*H04L 27/06* (2006.01)

(52) U.S. Cl.
CPC ..................................... *H04L 25/09* (2013.01)
USPC ........... 375/340; 375/260; 375/316; 375/344; 375/345; 455/75; 455/119; 455/173.1; 455/182.1; 455/182.2; 455/192.1; 455/219; 455/232.1; 455/234.1; 329/349; 329/353

(58) Field of Classification Search
CPC ....................................................... H04L 25/08
USPC ............ 375/260, 316, 340, 344, 345; 455/75, 455/119, 173.1, 182.1, 182.2, 192.1, 219, 455/232.1, 234.1; 329/349, 353
See application file for complete search history.

(56) References Cited

U.S. PATENT DOCUMENTS

| 8,260,610 | B2 | 9/2012 | Juncker et al. |
| 2002/0037061 | A1 | 3/2002 | Learned |
| 2005/0069066 | A1 | 3/2005 | Meyer et al. |
| 2011/0092231 | A1 | 4/2011 | Yoo et al. |
| 2012/0113878 | A1 | 5/2012 | Yu et al. |
| 2012/0244817 | A1 | 9/2012 | Das et al. |
| 2014/0044107 | A1* | 2/2014 | Jacob ............................ 370/336 |

FOREIGN PATENT DOCUMENTS

WO     2013083833 A1    6/2013

OTHER PUBLICATIONS

3rd Generation Partnership Project. "Digital cellular telecommunications system (Phase 2+); Radio transmission and reception (3GPP TS 45.005 version 10.0.0 Release 10)." ETSI TS 145 005, V10.0.0, Apr. 2011. Uploaded into 2 separate sections.
3rd Generation Partnership Project. "Voice Capacity Evolution with Orthogonal Sub Channels." 3GPP TSG GERAN #36, Tdoc GP-071792, Vancouver, Canada, Nov. 12-16, 2007.
Gerstacker, W., et al., GSM/EDGE: A mobile communications system determined to stay, International Journal of Electronics and Communications (AEÜ), 2011, pp. 694-700.
Meyer, R., et al., Efficient Receivers for GSM MUROS Downlink Transmission, Personal, Indoor and Mobile Radio Communications IEEE, 2009, pp. 2399-2403.
Qiu, Xun, Multiuser Detection for the Evolution of Speech Services in GSM, KTH Electrical Engineering, Master's Degree Project, Stockholm, Sweden, Jun. 2008, pp. 1-63.
Telefon AB Ericsson et al. "Modulation Detection in VAMOS DL." 3GPP TSG GERAN 44, GP-091985, Agenda item 7.1.5.3.3, Nov. 16-20, 2009, Sophia Antipolis, France, pp. 1-6.

* cited by examiner

*Primary Examiner* — Leon Flores (74) *Attorney, Agent, or Firm* — Coats and Bennett, PLLC (57) ABSTRACT

A desired signal and interfering signal are transmitted in the same timeslot and on the same frequency using an Adaptive Quadrature Phase Shift Keying (AQPSK) modulated carrier. When the Sub-Channel Power Imbalance Ratio (SCPIR) for the AQPSK modulated carrier is large and favors the interfering signal, the interfering signal is demodulated first to obtain demodulated soft bits. The demodulated soft bits corresponding to the interfering signal are then used to estimate receiver control parameters, such as Doppler shift, frequency offset, timing error, gain, etc. Using the demodulated soft bits corresponding to the interfering signal improves the accuracy of the receiver control parameters when the SCPIR is large, and results in better overall performance of the receiver.

33 Claims, 6 Drawing Sheets

PARAMETER ESTIMATION IN VAMOUS RECEIVERS

TECHNICAL FIELD

The present disclosure relates generally to parameter estimation in receivers for wireless networks and, more particularly, to parameter estimation in receivers implementing Voice Services Over Adaptive Multiuser Orthogonal Subchannels (VAMOS).

BACKGROUND

The rapid growth of subscribers in Global System for Mobile Communications (GSM) networks has led to need to increase system capacity. Voice Services Over Adaptive Multiuser Orthogonal Subchannels (VAMOS) is one technique for increasing system capacity in a GSM network. VAMOS allows two wireless terminals to be multiplexed into the same time slot on the same frequency. In the downlink, Adaptive Quadrature Phase Shift Keying (AQPSK) is used. The in-phase (I) and quadrature (Q) components of the complex baseband signal are treated as two sub-channels. The signal from one user is mapped to one sub-channel of an AQPSK modulated carrier and the signal for the other user is mapped to the other sub-channel of the AQPSK modulated carrier. Orthogonal training sequences are transmitted on each sub-channel and are used by the receivers in the wireless terminals to separate the two signals. More particularly, each wireless terminal uses its assigned training sequence to separate the desired signal transmitted on one sub-channel from the interfering signal transmitted on the other sub-channel.

VAMOS incorporates a sub-channel power control feature that allows the base station to divide the total downlink transmit power unequally between the sub-channels of the AQPSK modulated carrier. For example, the base station may allocate power to the sub-channels depending on the respective path losses to the paired wireless terminals, referred to hereinafter as a VAMOS pair. The sub-channel power control feature makes it possible to pair wireless terminals with different channel conditions to increase the VAMOS coverage area and to increase the number of possible VAMOS pairs. Thus, extra power can be allocated to one of the sub-channels at the expense of the paired sub-channel. When the power imbalance is large and favors the interfering signal, Successive Interference Cancellation (SIC) can be used to subtract the interfering signal from the received signal before demodulating the desired signal. However, the interference attributable to the interfering signal cannot be completely removed.

Parameters, such as Doppler shift, frequency offset, and timing error used to control the receiver are typically estimated from the desired signal. The residual interference after SIC in the case where the interfering signal is stronger can degrade the parameter estimation.

SUMMARY

The present disclosure provides methods and apparatus to estimate receiver control parameters, such a Doppler shift, frequency offset, and timing error in a VAMOS receiver using SIC. When VAMOS is used, the interfering signal and desired signal are affected by the same channel. Thus, when the sub-channel power imbalance ratio for the AQPSK modulated carrier is large and favors the interfering signal, the interfering signal is demodulated first to obtain demodulated soft bits. The demodulated soft bits corresponding to the interfering signal are then used to estimate the receiver control parameters. Using the demodulated soft bits corresponding to the interfering signal improves the accuracy of the receiver control parameters when the Sub-Channel Power Imbalance Ratio (SCPIR) is large and results in better overall performance of the receiver.

Exemplary embodiments of this disclosure comprise methods of controlling a receiver in a wireless communication network. A desired signal is received on a first subchannel of a quadrature modulated carrier. An interfering signal is received on a second subchannel of the quadrature modulated carrier. The receiver computes a power imbalance ratio indicative of a power distribution between the first and second subchannels. If the power imbalance ratio is greater than a threshold, the interfering signal is demodulated first to obtain demodulated soft bits corresponding to the interfering signal, and a receiver control parameter is estimated from the demodulated symbols corresponding to the interfering signal. The wireless terminal is controlled based on the receiver control parameter.

Other embodiments of this disclosure comprise a wireless terminal. In one embodiment, the wireless terminal comprises receiver circuits configured to receive a quadrature modulated carrier containing a desired signal on a first subchannel of the quadrature modulated carrier and an interfering signal on a second subchannel of the quadrature modulated carrier. The wireless communication circuit further comprises one or more processing circuits configured to compute a power imbalance ratio indicative of the power distribution between the first and second subchannels. The processing circuit is further configured to, if the power imbalance ratio is greater than a threshold, demodulate the interfering signal to obtain demodulated soft bits corresponding to the interfering signal, and estimate a receiver control parameter from the demodulated symbols corresponding to the interfering signal. The wireless terminal further comprises a control circuit configured to control the wireless terminal based on the receiver control parameter.

DETAILED DESCRIPTION

Figure 1:
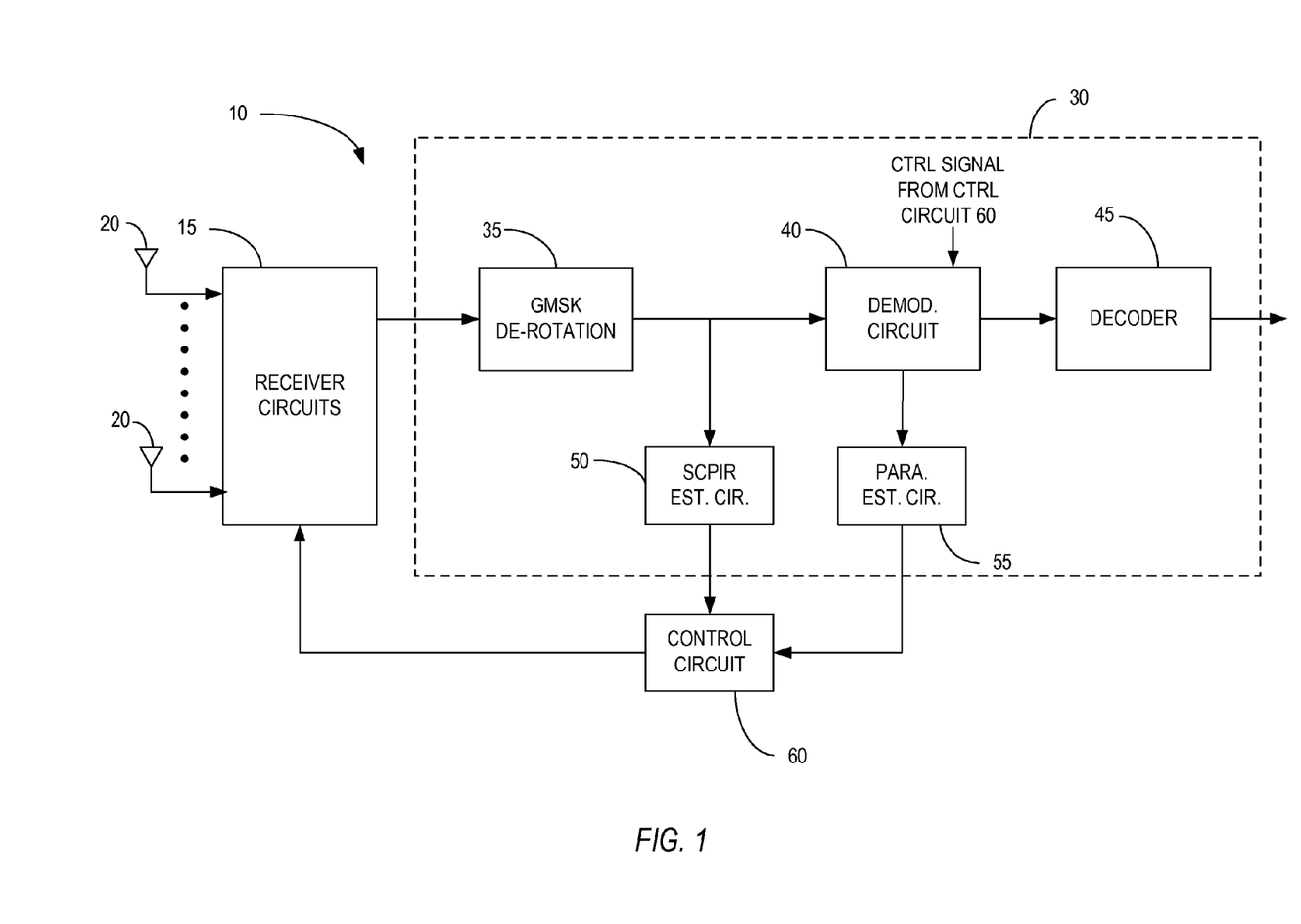
FIG. 1 illustrates an exemplary wireless terminal according to one embodiment.

Referring now to FIG. 1, a wireless terminal 10 according to one exemplary embodiment of the disclosure is shown. The wireless terminal 10 is configured to operate according to the Global System for Mobile Communication (GSM) standard. Those skilled in the art will appreciate that embodiments of this disclosure may be configured to operate according to other wireless communication standards such as Long Term Evolution (LTE), Wide Band Code Division Multiple Access (WCDMA), Worldwide Interoperability for Microwave Access (WIMAX), or other wireless communication standards now known or later developed.

The wireless terminal 10 is configured to implement Voice Services Over Adaptive Multi-user Orthogonal Sub-channels (VAMOS). VAMOS allows two wireless terminals 10 to be multiplexed in the same time slot on the same frequency. In the downlink, Adaptive Quadrature Phased Shift Keying (AQPSK) is used. The in-phase and quadrature components of the complex baseband signal are treated as separate sub-channels. The signal for one wireless terminal 10 is mapped to one sub-channel (i.e., the in-phase component of the complex baseband signal), and the signal for the paired wireless terminal 10 is mapped to the second sub-channel (i.e., the quadrature component of the complex baseband signal). Orthogonal training sequences are transmitted on each sub-channel and are used by the wireless terminal 10 to separate the desired signal (i.e., the signal intended for the wireless terminal 10) from the interfering signal (i.e., the signal intended for another wireless terminal 10). As known in the art, the training sequences comprise 26 bits in the middle of each transmitted burst. The wireless terminal 10 can use the training sequences transmitted on each channel to separate the two signals.

The wireless terminal 10 comprises receiver circuits 15 coupled to one or more antennas 20 for receiving signals over a wireless communication channel, one or more a processing circuits 30 for processing signals received by the wireless terminal 10, and a control circuit 60 for controlling the operation of the wireless terminal 10 as hereinafter described. Those skilled in the art will appreciate that the wireless terminal 10 may include additional components that are not illustrated. For example, the wireless terminal may include transmitter circuits for transmitting signals and processing circuits for processing the transmitted signal.

The receiver circuits 15 may comprise one or more receiver branches. Each receiver branch comprises analog circuits for amplifying, filtering and down-converting received complex baseband signals to a baseband frequency. An analog-to-digital converter converts the analog baseband signal received on each receiver branch to digital form for input to the processing circuit 30.

The processing circuits 30 comprise a Gaussian Minimum Shift Keying (GMSK) de-rotation circuit 35, a demodulation circuit 40, a decoder 45, a Sub-Channel Power Imbalance Ratio (SCPIR) estimation circuit 50, and a parameter estimation circuit 55. The processing circuits 30 may be implemented by one or more microprocessors, microcontrollers, hardware, firmware, or a combination thereof. The processing circuits 30 also include memory for storing programs and data used by the processing circuits 30. The memory may comprise both Random Access Memory (RAM) and Read-Only Memory (ROM), and may be implemented, for example, as one or more discrete devices, stacked devices, or removable devices, such as a flash drive or memory stick, or may be integrated with one or more microprocessors.

The GMSK de-rotation circuit 35 de-rotates the received complex baseband signal. The de-rotated signal is input to the demodulation circuit 40 and SCPIR estimation circuit 50. The function of the demodulation circuit 40 is to demodulate the desired signal on one of the sub-channels. The SCPIR estimation circuit 50 estimates the SCPIR. The estimated SCPIR is provided to the control circuit 60, which controls the wireless terminal 10.

Depending on the SCPIR, the demodulation circuit 40 may perform Successive Interference Cancellation (SIC) before demodulating the desired signal. The demodulated soft bits output from the demodulation circuit 40 are fed to a decoder 45. The decoder 45 decodes the demodulated soft bits to correct any errors that may have occurred during transmission and to generate a decoded bit stream.

The parameter estimation circuit 55 estimates receiver control parameters, such as Doppler shift, frequency offset, timing error, etc., from demodulated soft bits output by the demodulation circuit 40. Depending on the SCPIR, the demodulated soft bits output to the parameter estimation circuit 55 may comprise the demodulated soft bits corresponding to the desired signal (when the SCPIR is below a threshold) or the demodulated soft bits corresponding to the interfering signal (when the SCPIR is above the threshold). As explained in more detail below, using demodulated soft bits corresponding to the interfering signal when the SCPIR is large and favors the interfering signal improves the accuracy of the estimated receiver control parameters and the overall performance of the receiver in the wireless terminal 10.

The control circuit 60 controls the overall operation of the wireless terminal 10. The control circuit 60 may be implemented by one or more microprocessors, microcontrollers, hardware, firmware, or a combination thereof. The processing circuits 30 also include memory for storing programs and data used by the processing circuits 30. Memory may comprise both Random Access Memory (RAM) and Read-Only Memory (ROM), and may be implemented, for example, as one or more discrete devices, stacked devices, or removable devices, such as a flash drive or memory stick, or may be integrated with one or more microprocessors. Processing and memory resources used by the control circuit 60 may be shared with the processing circuits 30. For example, the control circuit 60 and processing circuits 30 may be embodied in a single microprocessor.

The control functions performed by the control circuit 60 include controlling the demodulation circuit 40 and controlling the receiver circuits 15. To perform these functions, the control circuit 60 receives the SCPIR estimate from the SCPIR estimation circuit 50, and receives the estimated receiver control parameters from the parameter estimation circuit 55. The control circuit 60 controls the demodulation circuit 40 depending on the SCPIR. More particularly, the control circuit 60 is configured to send a control signal to the demodulation circuit 40 to enable/disable SIC depending on the SCPIR. As noted above, SIC is disabled when the SCPIR is less than a threshold. SIC is enabled when the SCPIR is above the threshold. The control circuit 60 is also configured to control the receiver circuits 15 based on the receiver control parameters from the parameter estimation circuit 55. Receiver control functions performed by the control circuit 60 may comprise, for example, correcting the frequency offset and/or timing error or correcting the gain of the received signal.

It is assumed that VAMOS is used to transmit a desired signal to the wireless terminal 10. The desired signal is transmitted on one sub-channel of an AQPSK modulated carrier. The other sub-channel carries an interfering signal intended for another wireless terminal 10. The received complex baseband signal y(n) can be modeled as:

$$y(n) = \sum_{k=-\infty}^{+\infty} h(k) \left\{ \frac{\alpha}{\sqrt{2}} a_1(n-k) + j\sqrt{\frac{2-\alpha^2}{2}} a_2(n-k) \right\} + v(n) + w(n)$$

where h(k) is the Channel Impulse Response (CIR), $a_1(n)$ are the bits of the desired signal transmitted on the first subchannel, $a_2(n)$ are the bits of the interfering signal transmitted in the second sub-channel, v(n) is the interference, and w(n) is Additive White Gaussian Noise (AWGN). The quantity α is a shape parameter that determines the Sub-Channel Power Imbalance Ratio (SCPIR) in the sub-channels. The SCPIR is given by:

$$SCPIR = 10\log_{10}\left(\frac{2-\alpha^2}{\alpha^2}\right)$$

As previously noted, wireless terminal 10 may use training sequences transmitted on each sub-channel to separate the desired and interfering signals. In GSM networks, 26 training bits are transited in the middle of each burst. A data block comprises four bursts, so there are 114 training bits in each data block.

Figure 2:
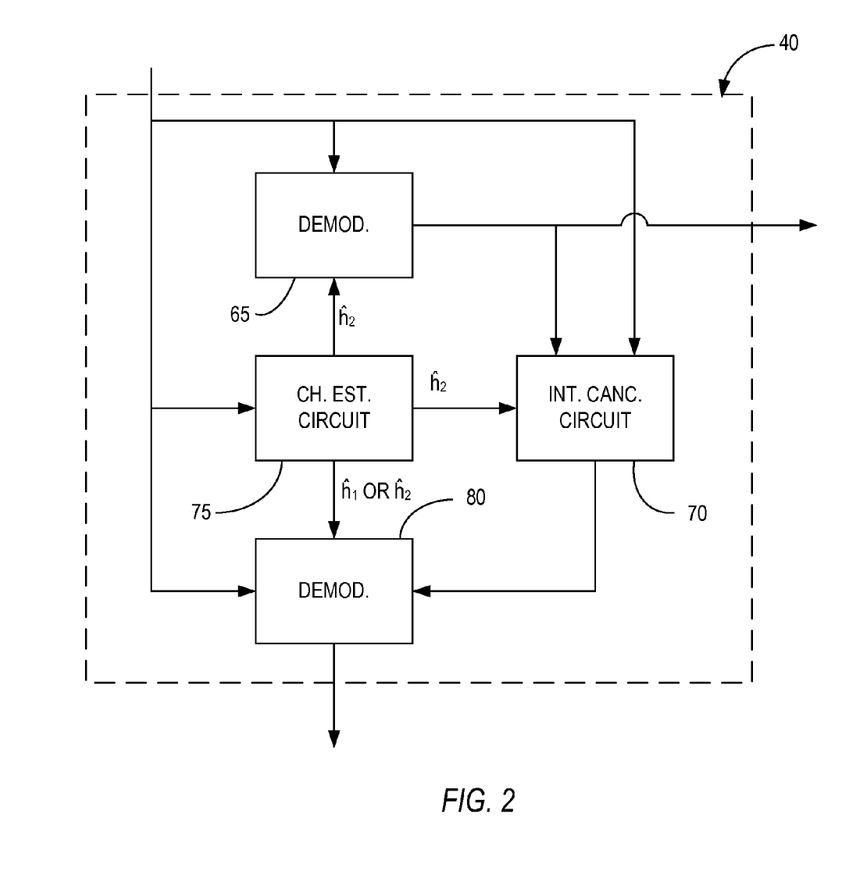
FIG. 2 illustrates the main functional elements of a demodulation circuit for the wireless terminal in a first embodiment.

FIG. 2 illustrates a demodulation circuit 40 according to one exemplary embodiment of this disclosure. The demodulation circuit 40 is configured to selectively perform SIC depending on the SCPIR. The demodulation circuit 40 comprises a demodulator 65, interference cancellation circuit 70, channel estimation circuit 75, and demodulator 80. The demodulator 65 is configured to demodulate the interfering signal when SIC is enabled. The demodulated soft bits output by the demodulator 65 and the received signal are fed to the interference cancellation circuit 70. The interference cancellation circuit 70 is configured to cancel the interfering signal from the received complex baseband signal to generate a reduced interference signal when SIC is enabled. The received complex baseband signal and reduced interference signal are input to the demodulator 80. The demodulator 80 is configured to demodulate the desired signal using either the received complex baseband signal or a reduced interference signal. The demodulated soft bits output from demodulator 80 are output to the decoder 45 (FIG. 1) as previously described. The channel estimation circuit 75 is configured to generate a channel estimate, denoted generically as $\hat{h}$, from the from the received complex baseband signal, which is used by the demodulator 65, interference cancellation circuit 70, and demodulator 80.

When SIC is disabled, the received complex baseband signal, after de-rotation by the GMSK de-rotation circuit 35, is input to demodulator 65 and channel estimation circuit 75. As previously noted, SIC is disabled by the control circuit 60 when the SCPIR is less than a threshold. A low SCPIR indicates that the interference from the interfering signal is low enough to enable accurate channel estimation and good demodulation performance. In this case, channel estimation circuit 75 generates a channel estimate $\hat{h}_1$ from the training symbols contained in the desired signal. The demodulator 80 then demodulates the desired signal using the channel estimate from the channel estimation circuit 75. The demodulated soft bits output by the demodulator 80 are then output to the decoder 45 and to the parameter estimation circuit 55 (FIG. 1). The parameter estimation circuit uses the demodulated soft bits corresponding to the desired signal to estimate one or more receive control parameters as previously described.

When SIC is enabled, the received complex baseband signal, after de-rotation by the GMSK de-rotation circuit 35, is input to demodulator 65, channel estimation circuit 75, and interference cancellation circuit 70. As previously noted, SIC is enabled by the control circuit 60 when the SCPIR is equal to or greater than a threshold. A high SCPIR indicates that the interference from the interfering signal is too high to enable accurate channel estimation and good demodulation performance using only the desired signal. In this case, the channel estimation circuit 75 generates a channel estimate $\hat{h}_2$ indicative of the channel conditions using the training sequence contained in the interfering signal. Using the training bits in the interfering signal for channel estimation is possible because the desired signal and interfering signal pass through the same channel.

The channel estimate $\hat{h}_2$ is input to demodulator 65, interference cancellation circuit 70, and demodulator 80. Demodulator 65 demodulates the interfering signal using the channel estimate $\hat{h}_2$ from the channel estimation circuit 75 to generate demodulated soft bits corresponding to the interfering signal. The demodulated soft bits output from the demodulator 65 are fed to the interference cancellation circuit 70 along with the received complex baseband signal. The demodulated soft bits output from the demodulator 65 are also fed to the parameter estimation circuit 55 for control parameter estimation. In the interference cancellation circuit 70, an estimate of the interfering signal is generated using the demodulated soft bits from the demodulator 65 and the channel estimate $\hat{h}_2$ from the channel estimation circuit 75. The estimate of the interfering signal is then subtracted from the received complex baseband signal to obtain a reduced interference signal that is input to the demodulator 80. The demodulator 80 demodulates the desired signal using the reduced interference signal and the channel estimate $\hat{h}_2$ to produce demodulated soft bits corresponding to the desired signal. The demodulated soft bits output from demodulator 80 are output to the decoder 35 (FIG. 1) as previously described. In this scenario, the demodulated soft bits from the decoder 80 are not used for parameter estimation. Rather, the demodulated soft bits output by demodulator 65 and corresponding to the interfering signal are used for parameter estimation in this case.

Figure 3:
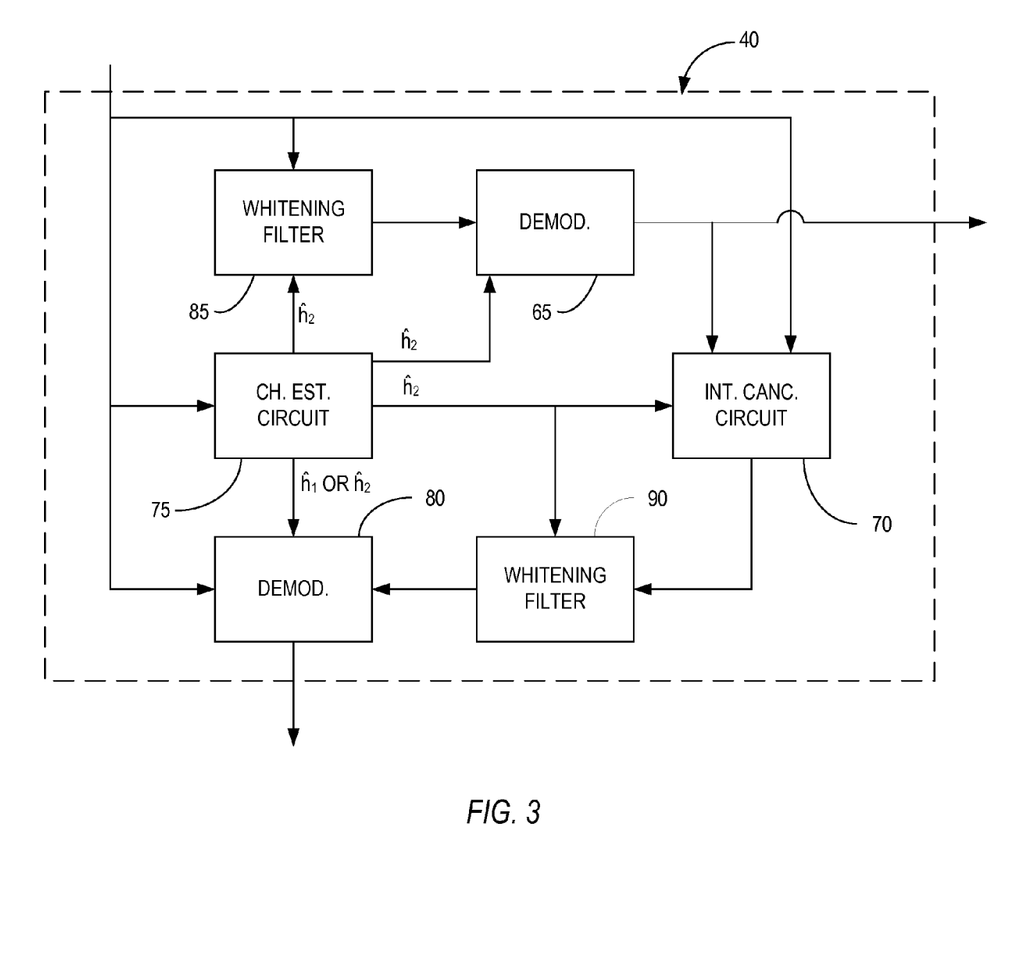
FIG. 3 illustrates the main functional elements of a demodulation circuit for the wireless terminal in a second embodiment.

FIG. 3 illustrates a demodulation circuit 40 according to another embodiment of this disclosure. The demodulation circuit 40 shown in FIG. 3 is similar to the embodiment shown in FIG. 2. Therefore, like reference numbers are used to indicate like elements. The demodulation circuit 40 comprises a demodulator 65, interference cancellation circuit 70, channel estimation circuit 75, and demodulator 80, all of which function as previously described. The demodulation circuit 40 further includes a whitening filter 85 for whitening the received complex baseband signal input to the demodulator 65 and a second whitening filter 90 for whitening the reduced interference signal input to the demodulator 80.

When SIC is disabled, the demodulation circuit 40 shown in this embodiment functions the same as the embodiment shown in FIG. 2. The received complex baseband signal, after de-rotation by the GMSK de-rotation circuit 35 (FIG. 1), is input to demodulator 65 and channel estimation circuit 75. As previously noted, SIC is disabled by the control circuit 60 (FIG. 1) when the SCPIR is less than a threshold. A low SCPIR indicates that the interference from the interfering signal is low enough to enable accurate channel estimation and good demodulation performance. In this case, channel estimation circuit 75 generates a channel estimate $\hat{h}_1$ from the training symbols contained in the desired signal. The demodulator 80 then demodulates the desired signal using the channel estimate from the channel estimation circuit 75. The demodulated soft bits output by the demodulator 80 are then output to the decoder 45 (FIG. 1) and to the parameter estimation circuit 55 (FIG. 1). The parameter estimation circuit uses the demodulated soft bits corresponding to the desired signal to estimate one or more receiver control parameters as previously described.

When SIC is enabled, the received complex baseband signal is input to the whitening filter 85. The whitening filter 85 whitens the received complex baseband signal using the channel estimate $\hat{h}_2$ from the channel estimation circuit 75. The whitened received complex baseband signal is input to the demodulator 65. Demodulator 65 demodulates the interfering signal using the channel estimate $\hat{h}_2$ from the channel estimation circuit 75 to generate demodulated soft bits corresponding to the interfering signal. The demodulated soft bits output from the demodulator 65 are fed to the interference cancellation circuit 70 along with the received complex baseband signal. The demodulated soft bits output from the demodulator 65 are also fed to the parameter estimation circuit 55 (FIG. 1) for control parameter estimation.

In the interference cancellation circuit 70, an estimate of the interfering signal is generated using the demodulated soft bits from the demodulator 65 and the channel estimate $\hat{h}_2$ from the channel estimation circuit 75. The estimate of the interfering signal is then subtracted from the received complex baseband signal to obtain a reduced interference signal that is input to the whitening filter 85. After whitening, the reduced interference signal is input to the demodulator 80. The demodulator 80 demodulates the desired signal using the reduced interference signal and the channel estimate $\hat{h}_2$ to produce demodulated soft bits corresponding to the desired signal. The demodulated soft bits output from demodulator 80 are output to the decoder 45 (FIG. 1) as previously described. In this scenario, the demodulated soft bits from the decoder 80 are not used for parameter estimation. Rather, the demodulated soft bits output by demodulator 65 and corresponding to the interfering signal are used for parameter estimation in this case.

Figure 4:
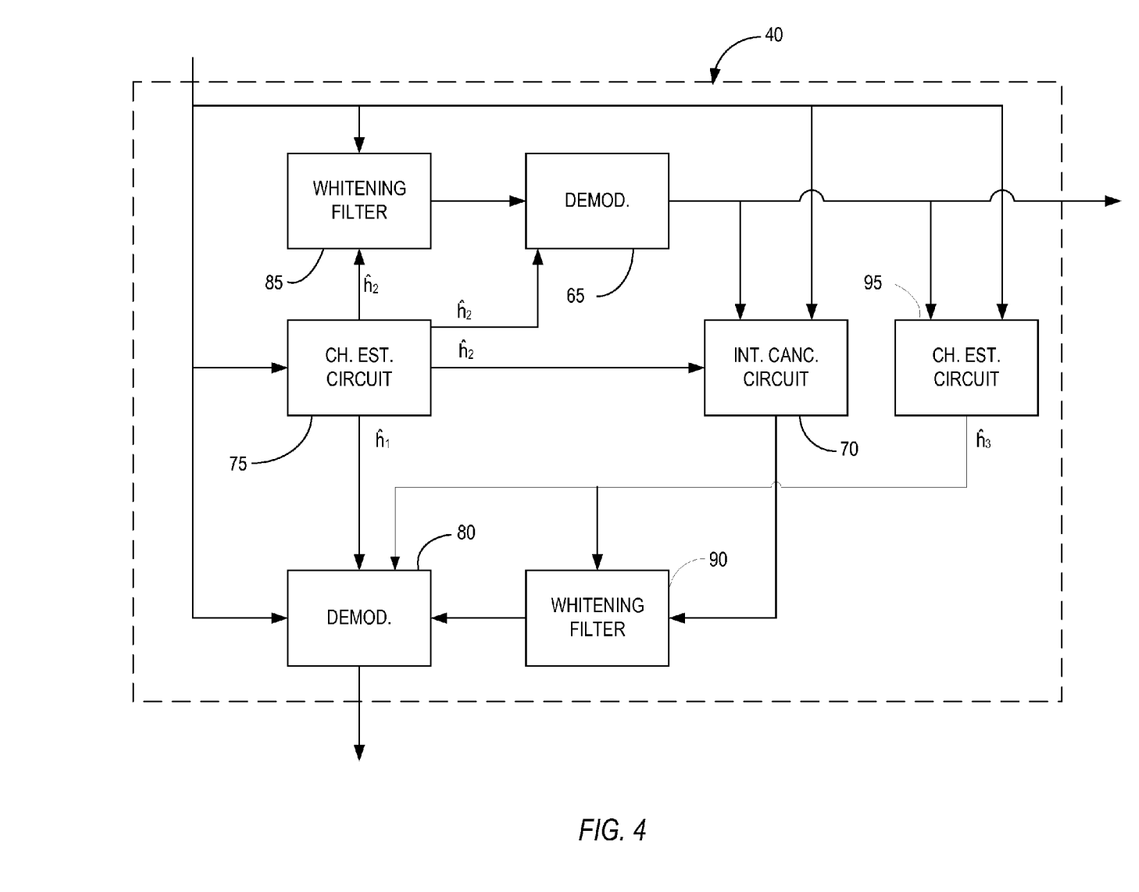
FIG. 4 illustrates the main functional elements of a demodulation circuit for the wireless terminal in a third embodiment.

FIG. 4 shows another embodiment of the demodulation circuit 40. This embodiment is similar to the embodiment shown in FIG. 3. Therefore, like reference numbers are used to indicate like elements. The demodulation circuit 40 comprises a demodulator 65, interference cancellation circuit 70, channel estimation circuit 75, demodulator 80, and whitening filters 85 and 90, and all of which function as previously described. The whitening filter 85 is used for whitening the received complex baseband signal input to the demodulator 65, and the second whitening filter 90 is used for whitening the reduced interference signal input to the demodulator 80. The demodulation circuit 40 further comprises a second channel estimation circuit 95 for deriving a revised least square channel estimate using the demodulated soft bits output by the demodulator 65.

When SIC is disabled, the embodiment of the demodulation circuit 40 shown in FIG. 4 functions the same as the embodiment shown in FIG. 3. The received complex baseband signal, after de-rotation by the GMSK de-rotation circuit 35 (FIG. 1), is input to demodulator 65 and channel estimation circuit 75. As previously noted, SIC is disabled by the control circuit 60 (FIG. 1) when the SCPIR is less than a threshold. A low SCPIR indicates that the interference from the interfering signal is low enough to enable accurate channel estimation and good demodulation performance. In this case, channel estimation circuit 75 generates a channel estimate $\hat{h}_1$ from the training symbols contained in the desired signal. The demodulator 80 then demodulates the desired signal using the channel estimate from the channel estimation circuit 75. The demodulated soft bits output by the demodulator 80 are then output to the decoder 45 and to the parameter estimation circuit 55 (FIG. 1). The parameter estimation circuit 55 uses the demodulated soft bits corresponding to the desired signal to estimate one or more receiver control parameters as previously described.

When SIC is enabled, the received complex baseband signal is input to the whitening filter 85. The whitening filter 85 whitens the received complex baseband signal using the channel estimate $\hat{h}_2$ from the channel estimation circuit 75. The whitened received complex baseband signal is input to the demodulator 65. Demodulator 65 demodulates the interfering signal using the channel estimate $\hat{h}_2$ from the channel estimation circuit 75 to generate demodulated soft bits corresponding to the interfering signal. The demodulated soft bits output from the demodulator 65 along with the received complex baseband signal are fed to the interference cancellation circuit 70 and channel estimation circuit 95. The demodulated soft bits output from the demodulator 65 are also fed to the parameter estimation circuit 55 for control parameter estimation and to the second channel estimation circuit 95.

In the interference cancellation circuit 70, an estimate of the interfering signal is generated using the demodulated soft bits from the demodulator 65 and the channel estimate $\hat{h}_2$ from the channel estimation circuit 75. The estimate of the interfering signal is then subtracted from the received complex baseband signal to obtain a reduced interference signal that is input to the whitening filter 90. The channel estimation circuit 95 generates a revised least square channel estimate $\hat{h}_3$ using the demodulated soft bits from the demodulator 65 and the received complex baseband signal. The revised least square channel estimate $\hat{h}_3$ is input to the whitening filter 90 and demodulator 80. The whitening filter 90 whitens the reduced interference signal. After whitening, the reduced interference signal is input to the demodulator 80. The demodulator 80 demodulates the desired signal using the whitened reduced interference signal and the channel estimate $\hat{h}_3$ to produce demodulated soft bits corresponding to the desired signal. The demodulated soft bits output from demodulator 80 are output to the decoder 45 (FIG. 1) as previously described. In this scenario, the demodulated soft bits from the decoder 80 are not used for parameter estimation. Rather, the demodulated soft bits output by demodulator 65 and corresponding to the interfering signal are used for parameter estimation in this case.

Figure 5:
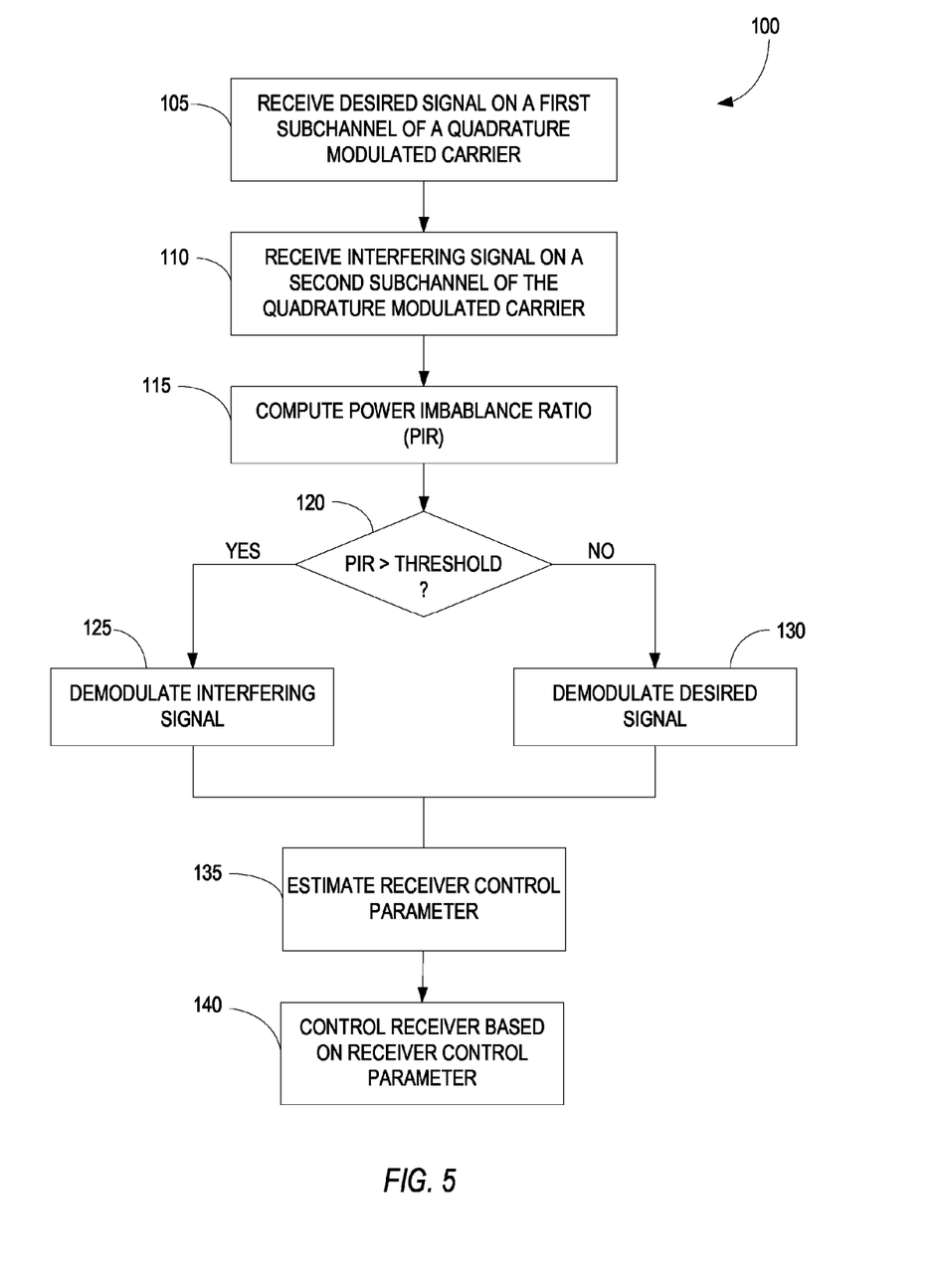
FIG. 5 illustrates an exemplary method of controlling a wireless terminal.

FIG. 5 illustrates an exemplary method 100 implemented by the wireless terminal 10 in one exemplary embodiment. The wireless terminal 10 receives a desired signal on a first sub-channel of a quadrature modulated carrier (block 105). The wireless terminal 10 also receives an interfering signal on a second sub-channel of the quadrature modulated carrier (block 110). The processing circuit 30 in the wireless terminal 10 computes a Sub-Channel Power Balance Ratio (SCPIR) indicating the distribution of power between the first and second sub-channels (block 115). The processing circuit 30 in the wireless terminal 10 compares the SCPIR to a threshold (block 120). If the SCPIR is less than the threshold, the processing circuit 30 in the wireless terminal 10 demodulates the desired signal (block 130) and estimates a receiver control parameter using the demodulated soft bits corresponding to the desired signal (block 135). The control circuit 60 in the wireless terminal 10 uses receiver control parameter to control the receiver (block 140). For example, the receiver control parameter may be used to correct a frequency offset or timing error, or to adjust the gain of the receiver. If the SCPIR is greater than the threshold, the processing circuit 30 in the wireless terminal 10 demodulates the interfering signal (block 125) and uses the demodulated soft bits corresponding to the interfering signal to estimate the receiver control parameter (block 135). The control circuit 60 then controls the receiver based on the computed receiver control parameter (block 140).

The receiver 10 may comprise a multi-branch receiver having multiple antennas or receiver branches. In some embodiments of this disclosure, the control circuit 60 may be configured to enable SIC on selected receiver branches depending on the SCPIR. In other embodiments, the control circuit 60 can be configured to select particular receiver branches for processing depending on the SCPIR. In either case, the SCPIR can be computed independently for each receiver branch.

Figure 6:
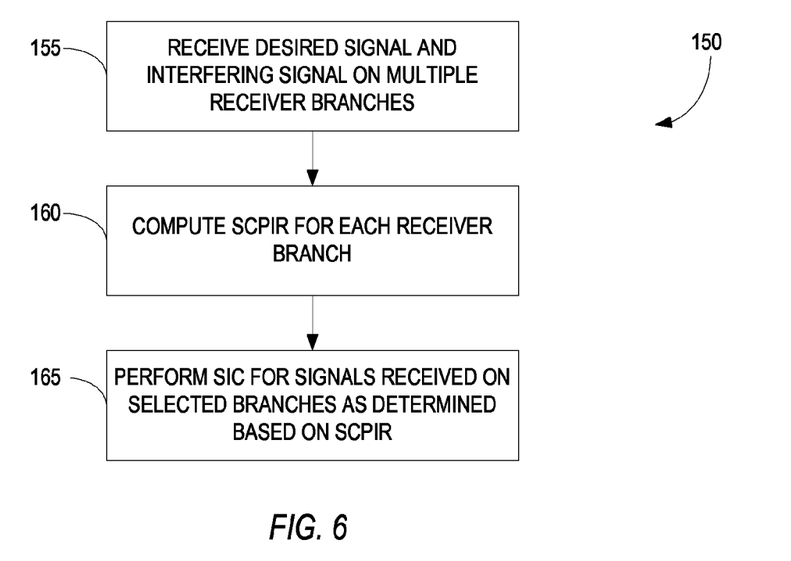
FIG. 6 illustrates a method of successive interference cancellation in a wireless terminal.

FIG. 6 illustrates an exemplary method 150 for successive interference cancellation in a wireless terminal 10 having a multi-branch receiver. The wireless terminal 10 receives the desired signal and interfering signal on multiple receiver branches (block 155). As previously described, the desired signal and interfering signal are received on respective sub-channels of an AQPSK modulated carrier. The processing circuit 30 in the wireless terminal 10 computes the SCPIR for each receiver branch (block 160). Successive interference cancellation is performed for signals received on selected receiver branches determined based on the SCPIR (block 165). For example, successive interference cancellation may be performed on the receiver branch that has the lowest SCPIR.

Figure 7:
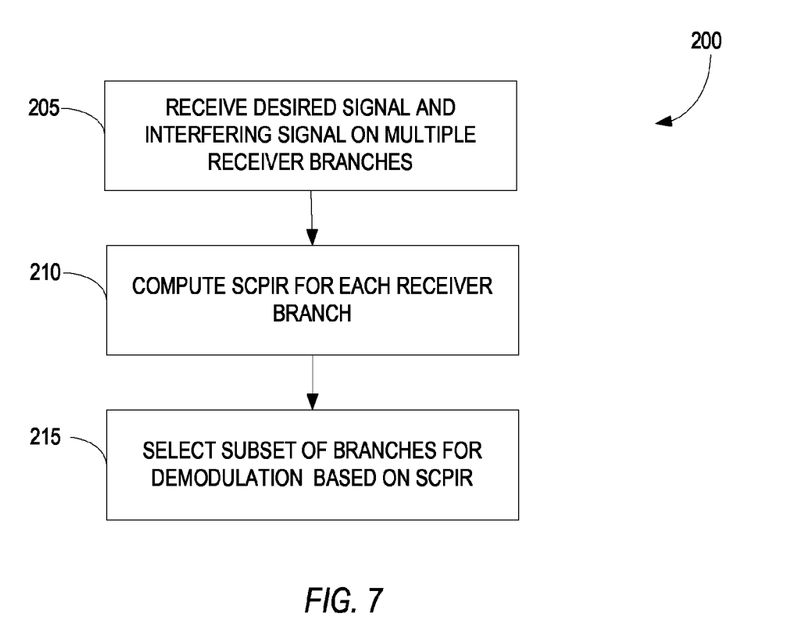
FIG. 7 is a method of branch selection in a wireless terminal.

FIG. 7 illustrates a method 200 implemented in a wireless terminal 10 having multi-branch receiver for selecting a subset of receiver branches for processing. The wireless terminal 10 receives a desired signal and an interfering signal on multiple receiver branches (block 205). As previously described, the desired signal and interfering signal are received on respective sub-channels of an AQPSK modulated carrier. The receiver computes the SCPIR for each receiver branch (block 210). A subset of receiver branches is then selected for demodulation based on the SCPIR values (block 215).

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method of controlling a receiver in a wireless communication network, the method comprising:
   receiving a desired signal on a first subchannel of a quadrature modulated carrier;
   receiving an interfering signal on a second subchannel of the quadrature modulated carrier;
   computing a power imbalance ratio indicative of a power distribution between the first and second subchannels; and
   if the power imbalance ratio is greater than a threshold:
      demodulating the interfering signal to obtain demodulated soft bits corresponding to the interfering signal;
      estimating a receiver control parameter from the demodulated symbols corresponding to the interfering signal, wherein the receiver control parameter comprises one of a frequency error, timing error, Doppler shift and receiver gain; and
      controlling the wireless terminal based on the control parameter.

2. The method of claim 1 wherein receiving a desired signal on a first subchannel of a quadrature modulated carrier comprises receiving the desired signal on one of an in-phase component and a quadrature component of the quadrature modulated carrier, and wherein receiving an interfering signal on a second subchannel of the quadrature modulated carrier comprises receiving the interfering signal on the other one of the in-phase component and the quadrature component of the quadrature modulated carrier.

3. The method of claim 1 wherein demodulating the interfering signal to obtain demodulated symbols corresponding to the interfering signal comprises:
   generating a first interfering channel estimate from training symbols in the interfering signal; and
   demodulating the interfering signal using the first interfering channel estimate.

4. The method of claim 3 further comprising whitening the interfering signal based on the first interfering channel estimate before demodulating the interfering signal.

5. The method of claim 1 wherein controlling the wireless terminal based on the receiver control parameter comprises controlling the receiver to correct for the estimated frequency error.

6. The method of claim 1 wherein controlling the wireless terminal based on the receiver control parameter comprises controlling the receiver to correct for the estimated timing error.

7. The method of claim 1 wherein controlling the wireless terminal based on the receiver control parameter comprises controlling a gain of the receiver.

8. The method of claim 1 further comprising:
   canceling interference in the desired signal attributable to the interfering signal based on the demodulated soft bits and the first interfering channel estimate to reduce interference in the desired signal; and
   demodulating the desired signal.

9. The method of claim 8 further comprising generating a second interfering channel estimate based on the demodulated soft bits corresponding to the interfering signal.

10. The method of claim 9 further comprising whitening the desired signal based on the second interfering channel estimate before demodulating the desired signal.

11. The method of claim 9 wherein demodulating the desired signal comprises demodulating the desired signal using the second interfering channel estimates.

12. The method of claim 8 further comprising generating desired channel estimates based on the desired signal.

13. The method of claim 12 wherein demodulating the desired signal comprises demodulating the desired signal using the desired channel estimates.

14. The method of claim 1 further comprising:
   receiving the desired signal and interfering signal on multiple receiver branches;
   computing a power imbalance ratio for each branch; and
   performing successive interference cancellation on selected branches as determined based on the power imbalance ratios.

15. The method of claim 1 further comprising:
   receiving the desired signal and interfering signal on multiple receiver branches;
   computing a power imbalance ratio for each branch; and
   selecting a subset of the receiver branches for processing based on the computed power imbalance ratios.

16. A wireless terminal comprising:
   receiver circuits configured to receive a quadrature modulated carrier containing a desired signal on a first subchannel of the quadrature modulated carrier and an interfering signal on a second subchannel of the quadrature modulated carrier;
   one or more processing circuits configured to:
      compute a power imbalance ratio indicative of the power distribution between the first and second subchannels;

if the power imbalance ratio is greater than a threshold, demodulate the interfering signal to obtain demodulated soft bits corresponding to the interfering signal; and estimate a receiver control parameter from the demodulated symbols corresponding to the interfering signal, wherein the receiver control parameter comprises one of a frequency error, timing error, Doppler shift and receiver gain; and a control circuit configured to control the wireless terminal based on the control parameter.

17. The wireless terminal of claim 16 wherein the receiver circuits are configured to receive the desired signal on one of an in-phase component and a quadrature component of the quadrature modulated carrier, and to receive the interfering signal on the other one of the in-phase component and the quadrature component of the quadrature modulated carrier.

18. The wireless terminal of claim 16 wherein the processing circuit comprises:
  a channel estimation circuit configured to generate a first interfering channel estimate from training symbols in the interfering signal; and
  a demodulator configured to demodulate the interfering signal using the first interfering channel estimate.

19. The wireless terminal of claim 16 wherein the processing circuit further comprises a whitening filter configured to whiten the interfering signal based on the first interfering channel estimate before demodulating the interfering signal.

20. The wireless terminal of claim 16 wherein the processing circuit comprises a parameter estimation circuit configured to estimate a frequency error of the interfering signal as the control parameter.

21. The wireless terminal of claim 20 wherein the control circuit is configured to control the receiver to correct for the estimated frequency error.

22. The wireless terminal of claim 16 wherein the processing circuit comprises a parameter estimation circuit configured estimate a timing error of the interfering signal.

23. The wireless terminal of claim 22 wherein the control circuit is configured to control the receiver to correct for the estimated timing error.

24. The wireless terminal of claim 16 wherein the processing circuit further comprises a parameter estimation circuit configured to estimate a receiver gain.

25. The wireless terminal of claim 24 wherein the control circuit is configured to control a gain of the receiver based on the estimated receiver gain.

26. The wireless terminal of claim 16 wherein the processing circuit further comprises:
  an interference cancellation circuit configured to cancel interference in the desired signal attributable to the interfering signal based on the demodulated soft bits and the first interfering channel estimate; and
  a demodulator configured to demodulate the desired signal after interference cancellation.

27. The wireless terminal of claim 26 wherein the processing circuit further comprises a second channel estimation circuit configured to generate a second interfering channel estimate based on the demodulated soft bits corresponding to the interfering signal.

28. The wireless terminal of claim 27 wherein the processing circuit further comprises a whitening filter configured to whiten the desired signal based on the second interfering channel estimate before demodulating the desired signal.

29. The wireless terminal of claim 27 wherein the processing circuit further comprises a demodulator configured to demodulate the desired signal with reduced interference using the second interfering channel estimates.

30. The wireless terminal of claim 26 wherein the processing circuit further comprises a channel estimation circuit configured to generate channel estimates based on the desired signal with reduced interference.

31. The wireless terminal of claim 30 wherein the demodulator is configured to demodulate the desired signal using the desired channel estimate.

32. The wireless terminal of claim 16 wherein the receiver circuit comprises multiple branches and wherein the processing circuit is further configured to:
  compute a power imbalance ratio for each branch; and
  perform successive interference cancellation on selected branches as determined based on the power imbalance ratios.

33. The wireless terminal of claim 16 wherein the receiver circuits comprise multiple branches and wherein the processing circuit is further configured to:
  compute a power imbalance ratio for each branch; and
  select a subset of the receiver branches for processing based on the computed power imbalance ratios.

* * * * *